United States Patent
Lee et al.

(10) Patent No.: US 9,405,460 B2
(45) Date of Patent: Aug. 2, 2016

(54) TOUCH MOUSE SUPPORTING KEY FUNCTIONS OF KEYBOARD DEVICE AND RELATED METHOD USED IN TOUCH MOUSE

(71) Applicant: PixArt Imaging Inc., Hsin-Chu (TW)

(72) Inventors: Yin-Hui Lee, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 154 days.

(21) Appl. No.: 13/889,334

(22) Filed: May 7, 2013

(65) Prior Publication Data

US 2014/0098054 A1    Apr. 10, 2014

(30) Foreign Application Priority Data

Oct. 9, 2012    (TW) .............................. 101137321 A

(51) Int. Cl.
G06F 3/045    (2006.01)
G06F 3/041    (2006.01)
G06F 3/0488   (2013.01)
G06F 3/044    (2006.01)
G06F 3/0354   (2013.01)

(52) U.S. Cl.
CPC .......... *G06F 3/0488* (2013.01); *G06F 3/03543* (2013.01); *G06F 3/044* (2013.01); *G06F 3/045* (2013.01); *G06F 3/04883* (2013.01)

(58) Field of Classification Search
CPC .............. G06F 3/04883; G06F 3/0488; G06F 3/04886; G06F 3/017; G06F 3/041
See application file for complete search history.

(56) References Cited

U.S. PATENT DOCUMENTS

| | | | |
|---|---|---|---|
| 2006/0007151 A1* | 1/2006 | Ram | 345/163 |
| 2007/0152966 A1* | 7/2007 | Krah et al. | 345/163 |
| 2010/0038151 A1* | 2/2010 | Chen | 178/18.03 |
| 2010/0103127 A1* | 4/2010 | Park | G06F 3/04886 345/173 |

* cited by examiner

*Primary Examiner* — Alexander Eisen
*Assistant Examiner* — Nan-Ying Yang
(74) *Attorney, Agent, or Firm* — Winston Hsu; Scott Margo

(57) ABSTRACT

A method used in a touch mouse includes: providing a touch area; using the touch area to detect a touch of a user's finger on the touch area to sense and generate a touch signal; and, generating a corresponding key output signal to a host by simulating a condition of pressing at least a key of a keyboard device according to the touch signal.

14 Claims, 5 Drawing Sheets

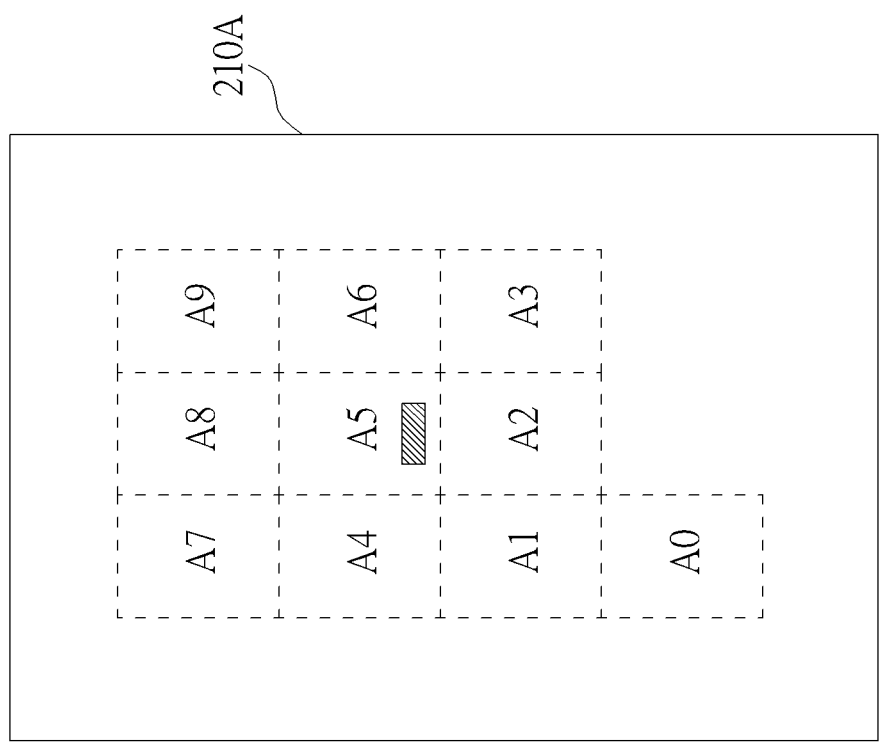

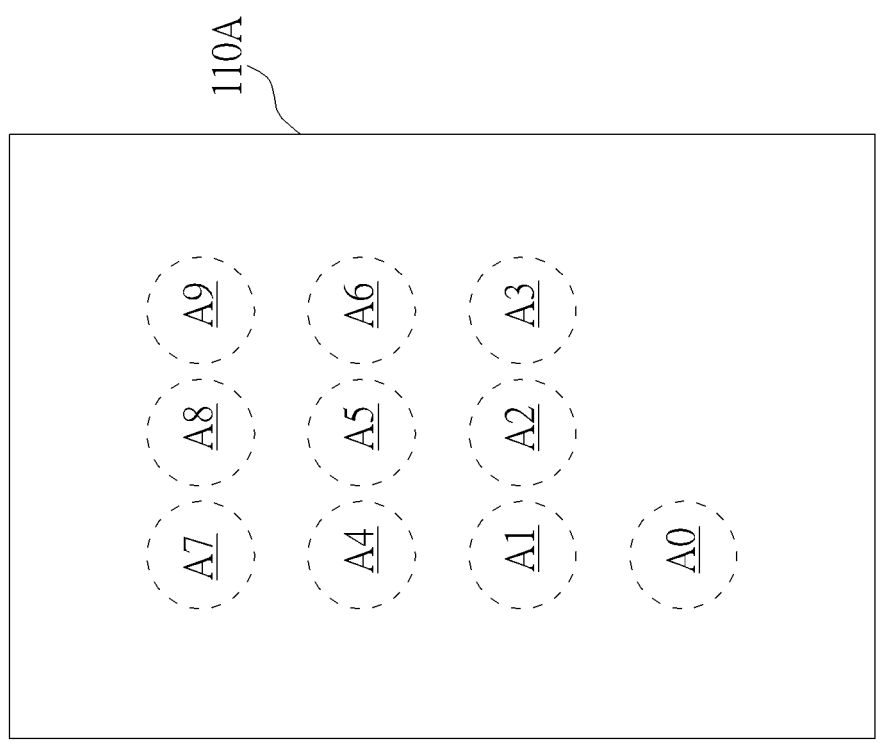

TOUCH MOUSE SUPPORTING KEY FUNCTIONS OF KEYBOARD DEVICE AND RELATED METHOD USED IN TOUCH MOUSE

BACKGROUND OF THE INVENTION

1. Field of the Invention

The disclosed embodiments of the present invention relate to a pointing input mechanism, and more particularly, to a touch mouse and related method used in the touch mouse.

2. Description of the Prior Art

Generally, current knowledge of the pointing input apparatus (e.g., a touch mouse) can be combined with gestures, thus allowing a user to enable more functions by utilizing the pointing input apparatus. For example, when a user is browsing web pages, a touch mouse may be utilized to perform different gestures which corresponds to different functions, such as "back" or "next", and therefore it provides an experience with higher maneuverability. Even so, the conventional pointing input apparatus, however, still cannot replace the keyboard device to provide a typing function. For example, when browsing the web pages, a user may need a simple typing or inputting an account and a password. Hence, the user's palm and fingers must leave the touch mouse and move to the keyboard device for typing, and then move back to the touch mouse for web page browsing. Using distinct keyboard device and touch mouse is undoubtedly inconvenient for users.

SUMMARY OF THE INVENTION

Thus, one of the objectives of the present invention is to provide a touch mouse combined with key functions of a physical keyboard device and a related method thereof, to avoid user inconvenience.

According to an embodiment of the present invention, a method used in a touch mouse is disclosed. The method includes: providing a touch panel having a touch area; using the touch panel to detect a touch of a user's finger on the touch area to sense and generate a touch signal; and generating a corresponding key output signal to a host by simulating a condition of pressing at least a key of a keyboard device according to the touch signal.

According to another embodiment of the present invention, a touch mouse is disclosed. The touch mouse includes a housing, a touch panel, and a processing circuit. The touch panel comprises a touch area disposed at a top area of the housing, arranged for detecting a touch of a user's finger on the touch area to sense and generate a touch signal. The processing circuit is coupled to the touch panel, and is arranged for generating a corresponding key output signal to a host by simulating a condition of pressing at least a key of a keyboard device according to the touch signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating a touch area of the touch mouse according to an embodiment of the present invention.

FIG. 5 is a diagram illustrating the touch area of the touch mouse according to another embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
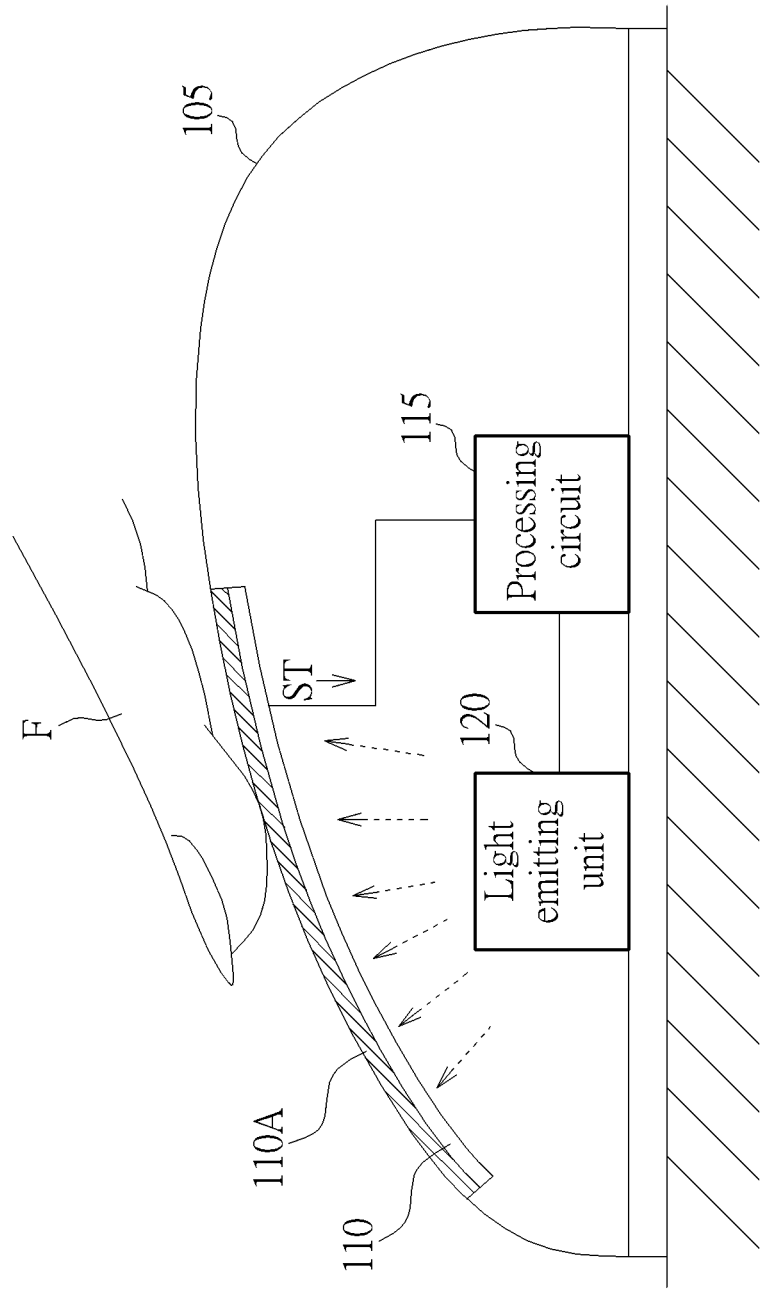
FIG. 1 is a diagram illustrating a touch mouse according to a first embodiment of the present invention.

Please refer to FIG. 1, which is a diagram illustrating a touch mouse 100 according to a first embodiment of the present invention. The touch mouse 100 includes a housing 105, a touch panel 110 (having a touch area 110A), a processing circuit 115, and a light emitting unit 120, wherein the touch panel 110 and the touch area 110A are disposed at top of the housing 105 (as shown in FIG. 1), and the touch area 110A is used to detect contact between a user's finger F and the touch area 110A, and accordingly generate a touch signal ST to the processing circuit 115. The touch mouse 100 supports two operation modes (e.g., a first operation mode and a second operation mode). When operating in the first operation mode, the touch mouse 100 is utilized for sensing the movement of the contact between the user's finger F and the touch area 110A (e.g., sliding action of the user's finger F on the touch area 110A), and executing corresponding functions of the touch mouse 100, where processing results of the corresponding functions are displayed on a monitor located at a host.

For example, when operating in the first operation mode, the touch mouse 100 can detect the contact movement of the finger F to perform functions such as the cursor navigation or gestures. In practice, the finger F slides on the touch area 110A, the touch panel 110 generates a touch signal ST to the processing circuit 115, and the processing circuit 115 analyzes the touch signal ST, performs actions or functions corresponding to the touch signal ST, and sends the results to the host. Taking the cursor navigation for example, the processing circuit 115 analyzes the touch signal ST, calculates the cursor navigation results corresponding to the touch signal ST, and sends the calculated cursor navigation results the host such that the monitor of the host would display the moving trajectory of the cursor.

When operating in the second operation mode, the touch mouse 100 may detect a touch click of the finger F to simulate a key output signal generated by pressing a physical key of a physical keyboard device (not shown in FIG. 1), and then transmit the simulated key output signal to the host. Thus, when using the touch mouse 100, the user is capable of performing the action of pressing at least one key of the physical keyboard device without operating the physical keyboard device. In other words, by simulating a condition where a key is pressed to therefore produce a key output signal, the touch mouse 100 in the embodiment of the present invention can allow the user to enter one or more keys while manipulating the touch mouse 100. Hence, the same effect of pressing a key of the physical keyboard device is achieved by simply controlling the switching of the operation modes and using the finger F to directly have a touch click on the touch area 110A of the touch mouse 100 without user's palm leaving the touch mouse 100.

For example, when the user wants to move the cursor of the host display screen to a certain coordinate and then performs the key input operation, the user can manipulate the touch mouse 100 in the first operation mode to move the cursor to the certain coordinate on the screen via sliding the finger F on the touch area 110A, and then switch the operation mode of the touch mouse 100 from the first operation mode to the second operation mode when the cursor has been moved to the coordinates on the screen. In the second operation mode, the finger F is utilized to click on a specific area of the touch area 110A. Meanwhile, the processing circuit 115 may determine that the user wants to perform the key input operation according to the touch signal ST (which indicates that a specific area on the touch area 110A has been clicked) from the touch panel 110, and therefore simulate a key output signal which is generated by pressing one physical key of a physical keyboard device, and transmit the simulated key output signal to the host.

Regarding the host, no matter whether the key pressing operation is performed by the touch mouse 100 in the embodiment of the present invention or a conventional physical keyboard device, the host receives the key output signal and performs the corresponding function. Therefore, it would not induce misjudgment when the touch mouse 100 in the embodiment of the present invention is utilized to replace part or all of the key functions of the conventional physical keyboard device. For example, when the user wants to have a digital number displayed on the screen, a key output signal identical to that of a number key can be generated to the host via directly touching a corresponding contact area in the touch area of the touch mouse 100 in the second operation mode, without moving his/her palm and fingers to the physical keyboard device to press the numeric key. Therefore, the touch mouse 100 can replace conventional numeric keys of the physical keyboard device. With regard to the operation, the touch mouse 100 may also have better manipulation convenience. It should be noted that the touch mouse 100 can also generate other key output signals corresponding to other keys of the physical keyboard device to the host, such as function keys, character keys, Windows keys, and editing keys. In other words, the touch mouse 100 may also replace key functions of the function keys, character keys, Windows keys, and editing keys of the physical keyboard device.

Figure 2:
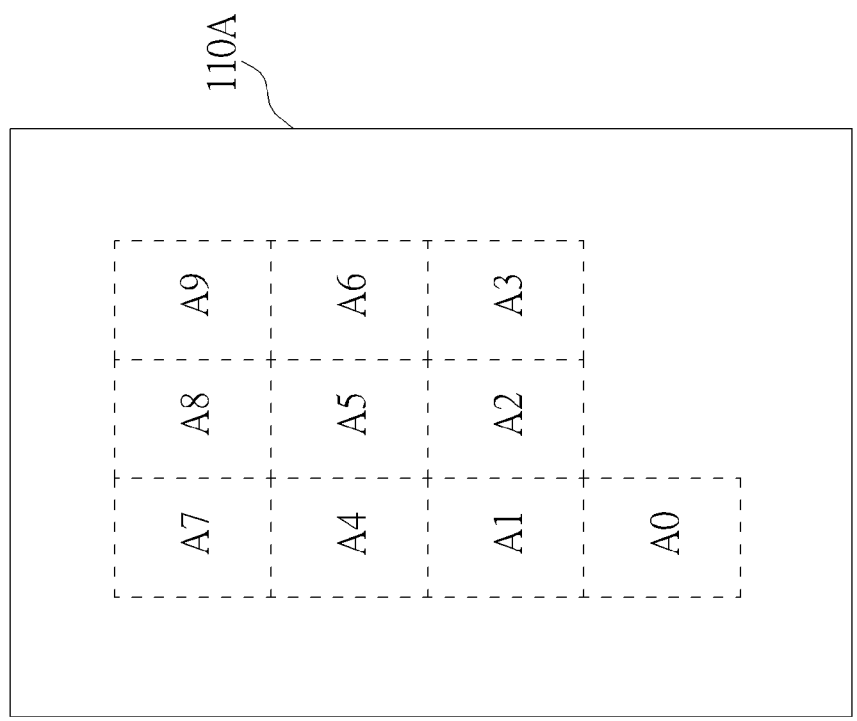
FIG. 2 is a diagram illustrating the touch area of the touch mouse shown in FIG. 1 according to an embodiment of the present.

Please refer to FIG. 2, which is a diagram illustrating the touch area 110A of the touch mouse 110 shown in FIG. 1 according to an embodiment of the present. As shown in FIG. 2, the touch area 110A includes a plurality of contact areas A0-A9, and the contact areas A0-A9 are used to simulate different keys of the physical keyboard device, respectively. For example, the contact areas A0-A9 correspond to ten physical numeric keys '0' to '9', respectively. This means that when the user's finger F touches a certain contact area, the corresponding key output signal can be produced by the processing circuit 115. For example, when the user's finger F touches the contact area A0, the touch panel 110 can sense the touch click of user's finger F on the contact area A0 and generate the touch signal ST correspondingly. Next, the touch panel 110 will transmit the touch signal ST to the processing circuit 115 for further analysis, and the processing circuit 115 will generate the simulated key output signal representative of the physical numeric key '0' according to the analysis result.

The touch signal ST generated by the touch panel 105 is used for indicating the contact position or contact area of the user's finger F. Hence, the processing circuit 115 may perform analysis and determine the contact position or contact area touched by user's finger F based on the touch signal ST, and accordingly determine which key output signal should be generated. Further, these dashed boxes shown in FIG. 2 are only representative of the positions of the contact areas A0-A9, respectively. In practice, it is not necessary to have these dashed boxes on the touch area 110A. In a preferred embodiment, the dashed boxes may not be included to indicate the positions of the contact areas A0-A9 for aesthetic consideration. However, this is not meant to be a limitation of the present invention.

Furthermore, it should be noted that the positions of the contact areas A0-A9 are determined for user's habit only, and this is not meant to be a limitation of the present invention. In other embodiments, the positions of the contact areas A0-A9 may be exchanged arbitrarily. In addition, the number of contact areas is not limited to the number of contact areas A0-A9. In other embodiments, it can also be provided with a design different from the exemplary design having ten contact areas. For example, an alternative design having only two contact areas also belongs to the scope of the present invention. Besides, the keyboard keys to which the contact areas correspond are not limited to the numeric keys only. To put it another way, the contact areas may correspond to function keys, character keys, Windows keys and editing keys of the physical keyboard device, or any combination of function keys, character keys, Windows keys and editing keys of the physical keyboard device (i.e., a combinational key of the physical keyboard device). That is to say, the contact areas can correspond to any combination of keys of the physical keyboard device, and the details are omitted here for brevity. Any alternative designs based on aforementioned embodiments all belong to the scope of the present invention.

Further, in order to assist the user in operating of the touch mouse as well as improve the accuracy, the embodiment shown in FIG. 1 provides the light emitting unit 120 to emit at least a point light source (which may be realized by a light emitting diode) toward at least one contact area of the touch area 110A for clearly indicting a physical position of the contact area on the touch area 110A for user's convenience. As shown in FIG. 1, the light emitting unit 120 emits a plurality of point light sources to the touch panel 110 for clearly indicating and positioning the positions of the contact areas A0-A9 shown in FIG. 2, wherein the point light sources all point at centers of the contact areas A0-A9. Therefore, when the touch mouse 100 operates in the second operation mode, the point light sources can generate bright spots on the surface of the contact areas A0-A9, so that the user can know the exact positions of the contact areas A0-A9 before performing the touch click action. In addition, in other embodiments, the light emitting unit 120 may also emit only one point light source to a contact area. For example, the light emitting unit 120 emits a single point light source to the contact area A5 shown in FIG. 2 to indicate the position of the contact region A5. It should be noted that, even though only one contact area is indicated, it is helpful for enhancing the input accuracy since the user can find out approximate locations of other contact regions A0-A4 and A6-A9 by referring to the indicated position contact region A5. In addition, emitting a single point light source to indicate the position of a single contact area is not limited to marking the position of the contact area A5. It is also feasible to emit a single point light source to mark the position of a different contact area, which also complies with the spirit of the present invention.

Figure 3:
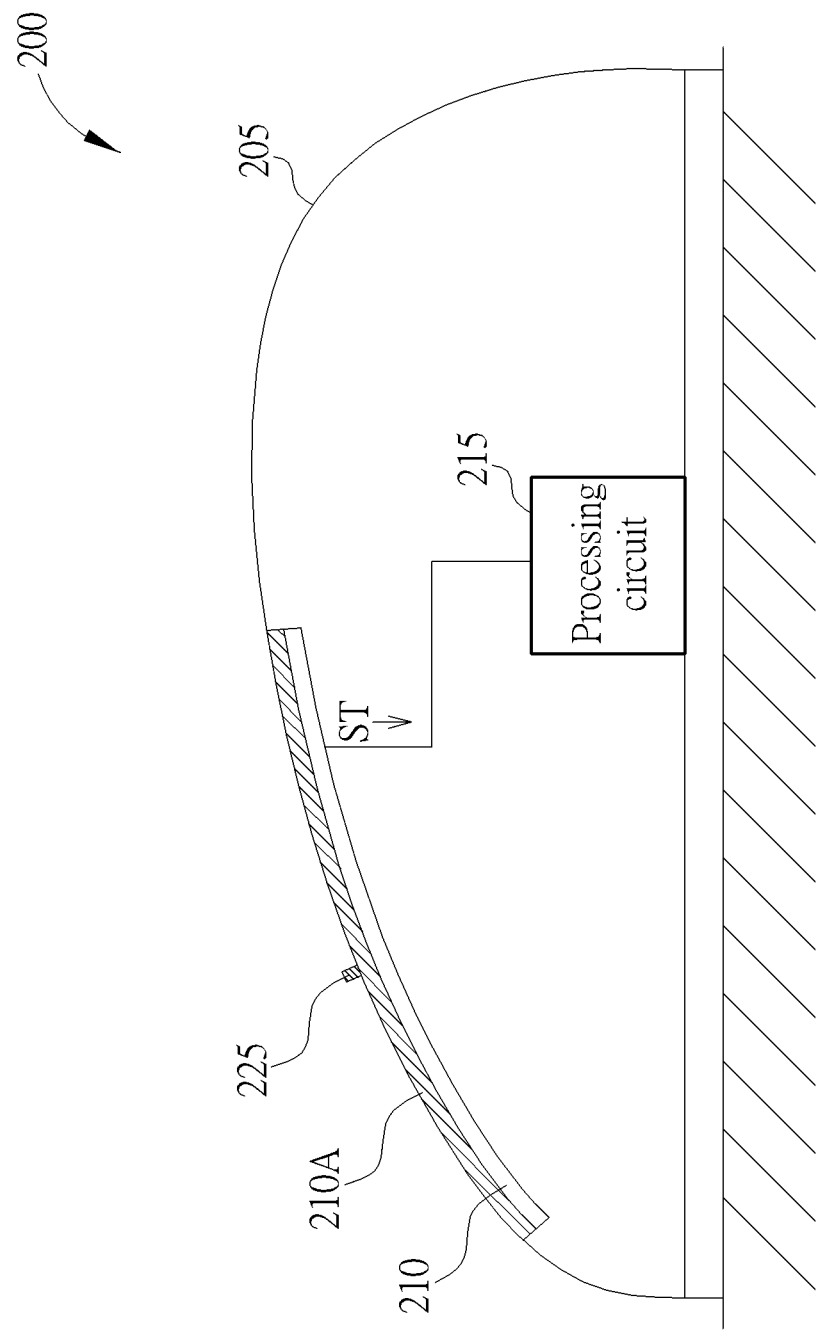
FIG. 3 is a diagram illustrating a touch mouse according to a second embodiment of the present invention.

Furthermore, regarding the assistance in user's operation of the touch mouse as well as the enhancement of the input accuracy, it may also take advantage of a physical positioning point instead of using the light emitting unit 120 shown in FIG. 1. Please refer to FIG. 3 in conjunction with FIG. 4. FIG. 3 is a diagram illustrating a touch mouse 200 according to a second embodiment of the present invention, and FIG. 4 is a diagram illustrating a touch area 210A of the touch mouse 200 according to an embodiment of the present invention. The touch mouse 200 includes a housing 205, a touch panel 210 (having the touch area 210A), a processing circuit 215, and a physical positioning point 225. The operations and functions of the housing 205, the touch panel 210, the touch area 210A, and the processing circuit 215 are identical or similar to that of the housing 105, the touch panel 110, the touch area 110A, and the processing circuit 115. The difference between the embodiments of FIG. 1 and FIG. 3 is that the embodiment of FIG. 3 utilizes and disposes the physical positioning point 225 on the surface of the touch area 210A to mark/indicate the location of a contact area. As shown in FIG. 4, in this embodiment, the touch area 210A includes a plurality of contact areas A0-A9, and the contact areas A0-A9 correspond to numeric keys '0' to '9' of the physical keyboard device, respectively. The physical positioning point 225 is placed at the center point of the contact area A5 to mark the position of the contact area A5. However, this is not meant to be a limitation of the invention. In other embodiments, the physical positioning point 225 may be disposed at a different contact area. In practice, the purpose of using the physical positioning point 225 is to allow the user to immediately know the correct position of a key input entered via a touch click while his/her finger touches the physical positioning point 225.

Besides, in order to assist the user in operating the touch mouse, the processing circuit 115 may also notify the host to invoke a software program for displaying the corresponding key of the current contact area on the display screen, or displaying the corresponding key of the contact area which is currently touched. The software program may be implemented by a desktop widget program.

Further, the above-mentioned contact areas may also be implemented using a plurality of contact points. For instance, the contact areas A0-A9 shown in FIG. 2 are represented by a plurality of contact points, respectively. Hence, the touch panel 110 will generate the correct touch signal to the processing circuit 115 only when the user's finger F touches a contact point. Please refer to FIG. 5, which is a diagram illustrating the touch area 110A of the touch mouse 100 according to another embodiment of the present invention. As shown in FIG. 5, the contact areas A0-A9 include a plurality of contact points marked by the dashed circles. The touch panel 110 will generate the correct touch signal to the processing circuit 115 only when the user's finger F touches any contact points represented by the dashed circles. The embodiment shown in FIG. 5 is also applicable to the aforementioned design which employs the point light source(s) or the physical positioning point(s) to mark one or more contact areas.

Further, switching between the above-described first and second operation modes may be manually controlled by the user. In practice, a switch (such as a key or button) can be set on a non-touch-control area of the touch mouse 100 (e.g., sides of the housing 105), and the user may determine the current operation mode to be the first operation mode or the second operation mode by pressing the switch. Therefore, when the user moves the mouse cursor to a certain position of the display screen for a key input operation in the first operation mode, the user can switch the operation mode of the touch mouse to the second operation mode by using his/her finger to press the switch without moving his/her palm away from the touch mouse. Then, in the second operation mode, one or more different key output signals would be simulated and outputted to the host through the user's finger touching one or more different contact areas or contact points. Hence, the display screen of the host will show results of the key inputs. In other words, the touch mouse 100 can replace some of the functions of the physical keyboard device.

Further, although a corresponding simulated key output signal is decided through determining a contact point or contact area touched by the user's finger in the second operation mode of the above embodiments, the present invention is not limited to generating the simulated key output signals through detecting the click touch of the user's finger F since the main technical spirit of the present invention is to separate the original gesture function (i.e., the function of the first operation mode) and the key output simulation function (i.e., the function of the second operation mode) by utilizing different operation modes. In other embodiments, a corresponding simulated key output signal may be decided by determining the sliding touch of the user's finger, and it also belongs to the scope of the present invention.

The above-mentioned embodiments employ an optical touch panel as an example. However, the touch panel of the present invention can also be implemented by a capacitive touch panel, a resistive touch panel, a piezoelectric touch panel, or an electromagnetic touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method used in a touch mouse, comprising:
providing a touch panel having a touch area that is uncovered, the touch panel being capable of switching between a first operation mode and a second operation mode wherein the touch panel in the first operation mode is used for moving a cursor to a certain coordinate on a screen and in the second operation mode is used for performing a key input operation, a total touch area corresponding to the first operation mode being larger than a total touch area corresponding to the second operation mode, the touch panel being an optical touch panel entirely receiving image(s) of the touch area to detect contact movement to perform navigation functions of at least one of cursor navigation and gesture;
using the touch panel to detect a touch of a user's finger on the touch area to sense and generate a touch signal; and
generating a corresponding key output signal to a host by simulating a condition of pressing at least one key of a keyboard device according to the touch signal;
wherein the touch area is divided into a plurality of contact areas under the second operation mode, and each contact area corresponds to at least a key of the keyboard device, and the step of generating the corresponding key output signal by simulating the condition of pressing the at least one key of the keyboard device further comprises:
providing at least one point light source, and utilizing the point light source to emit light toward at least one contact area within the contact areas for indicating a position of the at least one contact area;

referring to the touch signal for determining a contact area in the touch area that is touched by the user's finger, and accordingly deciding the at least one key of the keyboard device; and generating the corresponding key output signal to the host by simulating the condition of pressing the at least one key of the keyboard device.

2. The method of claim 1, wherein the touch mouse supports the first operation mode and the second operation mode, and the method further comprises:

in the first operation mode, referring to the touch signal for generating a corresponding function signal to the host while manipulating the touch mouse;

wherein the step of generating the corresponding key output signal to the host by simulating the condition of pressing the at least one key of the keyboard device is performed in the second operation mode.

3. The method of claim 1, wherein the contact areas correspond to at least one of a plurality of numeric keys, a plurality of function keys, and a plurality of combinational key of the keyboard device; each combinational key comprises a plurality of keys of the keyboard device; and the at least one key is at least one of a numeric key, a function key and a combinational key.

4. The method of claim 1, wherein the contact areas are a plurality of contact points respectively, and the method further comprises:

determining a contact area touched by the user's finger inside the touch area in accordance with the touch signal to decide the at least one key of the keyboard device; and generating the corresponding key output signal to the host by simulating the condition of pressing the at least one key of the keyboard device.

5. The method of claim 1, further comprising:

providing at least one positioning point on the touch area to indicate a position of at least one contact area.

6. The method of claim 1, wherein the step of generating the corresponding key output signal to the host by simulating the condition of pressing the at least one key of the keyboard device comprises:

referring to the touch signal for determining a movement of the user's finger while the user's finger touches the touch area to decide the at least one key of the keyboard device; and generating the corresponding key output signal to the host by simulating the condition of pressing the at least one key of the keyboard device.

7. The method of claim 6, wherein the at least one key is one of a function key and a combinational key of the keyboard device.

8. A touch mouse, comprising:

a housing;

at least one point light source;

a touch panel, comprising a touch area disposed at a top area of the housing, the touch panel arranged for detecting a touch of a user's finger on the touch area to sense and generate a touch signal, the touch area being uncovered, and the touch panel being capable of switching between a first operation mode and a second operation mode wherein the touch panel in the first operation mode is used for moving a cursor to a certain coordinate on a screen and in the second operation mode is used for performing a key input operation, a total touch area corresponding to the first operation mode being larger than a total touch area corresponding to the second operation mode, the touch panel being an optical touch panel entirely receiving image(s) of the touch area to detect contact movement to perform navigation functions of at least one of cursor navigation and gesture; and a processing circuit, coupled to the touch panel, the processing circuit arranged for generating a corresponding key output signal to a host by simulating a condition of pressing at least one key of a keyboard device according to the touch signal;

wherein the touch area is divided into a plurality of contact areas under the second operation mode, and each contact area corresponds to at least a key of the keyboard device; the at least one point light source is arranged for emitting light toward at least one contact area within the contact areas for indicating a position of the at least one contact area; and, the processing circuit refers to the touch signal to determine a contact area in the touch area that is touched by the user's finger and therefore decide the at least one key of the keyboard device, and generates the corresponding key output signal to the host by simulating the condition of pressing the at least one key of the keyboard device.

9. The touch mouse of claim 8, wherein the touch mouse supports the first operation mode and the second operation mode; in the first operation mode, the processing circuit refers to the touch signal to generate a corresponding function signal to the host while the touch mouse is manipulated; and in the second operation mode, the processing circuit generates the corresponding key output signal to the host by simulating the condition of pressing the at least one key of the keyboard device.

10. The touch mouse of claim 8, wherein the contact areas correspond to at least one of a plurality of numeric keys, a plurality of function keys, and a plurality of combinational keys of the keyboard device; each combinational key comprises a plurality of keys of the keyboard device; and the at least one key is at least one of a numeric key, a function key, and a combinational key.

11. The touch mouse of claim 8, wherein the contact areas are a plurality of contact points, respectively; and the processing circuit refers to the touch signal to determine a contact area in the touch area that is touched by the user's finger and therefore decide the at least one key of the keyboard device, and generates the corresponding key output signal to the host by simulating the condition of pressing the at least one key of the keyboard device.

12. The touch mouse of claim 8, wherein the touch area comprises:

at least one positioning point, arranged to indicate a position of at least one contact area.

13. The touch mouse of claim 8, wherein the processing circuit refers to the touch signal to determine a movement of the user's finger while the user's finger touches the touch area and therefore decide the at least one key of the keyboard device, and generates the corresponding key output signal to the host by simulating the condition of pressing the at least one key of the keyboard device.

14. The touch mouse of claim 13, wherein the at least one key is one of a function key and a combinational key of the keyboard device.

* * * * *